(12) United States Patent
Lo (10) Patent No.: US 10,698,832 B2
(45) Date of Patent: Jun. 30, 2020

(54) METHOD OF USING MEMORY ALLOCATION TO ADDRESS HOT AND COLD DATA

(71) Applicant: National Chung Cheng University, Chia-Yi (TW)

(72) Inventor: Shi-Wu Lo, Tainan (TW)

(73) Assignee: NATIONAL CHUNG CHENG UNIVERSITY, Min-Hsiung, Chia-Yi (TW)

(*) Notice: Subject to any disclaimer, the term of this patent is extended or adjusted under 35 U.S.C. 154(b) by 0 days.

(21) Appl. No.: 16/050,221

(22) Filed: Jul. 31, 2018

(65) Prior Publication Data

US 2019/0179763 A1 Jun. 13, 2019

(30) Foreign Application Priority Data

Dec. 13, 2017 (TW) .............................. 106143789 A (51) Int. Cl.
*G06F 12/08* (2016.01)
*G06F 12/0891* (2016.01)
(Continued)

(52) U.S. Cl.
CPC .......... *G06F 12/0891* (2013.01); *G06F 3/064* (2013.01); *G06F 3/068* (2013.01); *G06F 3/0616* (2013.01); *G06F 3/0625* (2013.01); *G06F 3/0631* (2013.01); *G06F 3/0653* (2013.01); *G06F 3/0656* (2013.01); *G06F 12/06* (2013.01);
(Continued)

(58) Field of Classification Search
CPC .... G06F 3/0628; G06F 3/0631; G06F 3/0653; G06F 2212/205; G06F 3/0646; G06F 3/0655; G06F 3/068; G06F 3/0683
See application file for complete search history.

(56) References Cited

U.S. PATENT DOCUMENTS 6,996,676 B2 * 2/2006 Megiddo ............... G06F 12/122
   711/129
9,747,202 B1 * 8/2017 Shaharabany ...... G06F 12/0253
(Continued)

OTHER PUBLICATIONS

Ranjith Subrannanian, Gabriel H. Loh, Yannis Smaragdakis, Adaptive Caches: Effective Shaping of Cache Behavior to Workloads, IEEE, 2006 (Year: 2006).*
(Continued)

*Primary Examiner* — Khoa D Doan
(74) *Attorney, Agent, or Firm* — Muncy, Geissler, Olds & Lowe, P.C.

(57) ABSTRACT

The present invention discloses a method of using memory allocation to address hot and cold data, which comprises steps: using a hardware performance monitor (HPM) to detect at least one read/write event of a central processor; while a number of the read/write events reaches a threshold or a random value, a computer system recording an access type of the read/write event occurring latest and a memory address causing the read/write event; and the computer system assigning the memory object in the memory address to a volatile memory or a non-volatile memory according to the memory address and the access type. Thereby, data pages can be assigned automatically according to the access types categorized by the central processor, exempted from being assigned manually by engineers.

41 Claims, 4 Drawing Sheets

(51) Int. Cl.
*G06F 12/06* (2006.01)
*G06F 3/06* (2006.01)

(52) U.S. Cl.
CPC ........... *G06F 2212/1028* (2013.01); *G06F 2212/1036* (2013.01); *G06F 2212/205* (2013.01); *G06F 2212/604* (2013.01)

(56) References Cited

U.S. PATENT DOCUMENTS

| | | | |
|---|---|---|---|
| 2012/0023300 A1* | 1/2012 | Tremaine | G06F 12/1009 711/162 |
| 2012/0209893 A1* | 8/2012 | Kim | G06F 16/17 707/822 |
| 2015/0347028 A1* | 12/2015 | Kotte | G06F 3/0611 711/154 |
| 2016/0011971 A1* | 1/2016 | Lee | G06F 12/0246 711/103 |
| 2016/0179683 A1* | 6/2016 | Chen | G06F 12/0862 711/103 |
| 2017/0308722 A1* | 10/2017 | Oikawa | G06F 12/00 |
| 2018/0165189 A1* | 6/2018 | Tai | G06F 3/0608 |
| 2018/0293121 A1* | 10/2018 | Zhou | G06F 3/061 |

OTHER PUBLICATIONS

Michael Giardino, Kshitij Doshi, Bonnie Ferri, "Soft2LM: Application Guided Heterogenous Memory Management", 2016 IEEE International Conference on Networking, Architecture and Storage (NAS) (pp. 1-10) (Year: 2016).*

H. Chang and W. Sung, "Access-Pattern-Aware On-Chip Memory Allocation for SIMD Processors," in IEEE Transactions on Computer-Aided Design of Integrated Circuits and Systems, vol. 28, No. 1, pp. 158-163, Jan. 2009. (Year: 2009).*

* cited by examiner

METHOD OF USING MEMORY ALLOCATION TO ADDRESS HOT AND COLD DATA

This application claims priority for Taiwan patent application no. 106143789 filed on Dec. 13, 2017, the content of which is incorporated by reference in its entirety.

BACKGROUND OF THE INVENTION

Field of the Invention

The present invention relates to a memory location configuration method, particularly to a method of using memory allocation to address hot and cold data.

Description of the Related Art

With development of science, the computer is becoming more and more complicated, and the amount of the accessed data is growing larger and larger. Many different types of memories have been developed to accelerate the speed of accessing data, such as the volatile memories, the non-volatile memories, and the flash memories. Besides, how to configure the storage of data to accelerate the access of data without overburdening the system also becomes an important subject in the field.

General to speak, the frequently-used data is stored in a volatile memory, such as a dynamic random access memory (DRAM); the infrequently-used data is stored in a non-volatile memory. While the volatile memory and the non-volatile memory are combined to form a mixed-type memory structure, the current computer cannot automatically configure the memory locations of data. The data are assigned to a volatile or non-volatile memory by engineers manually at present. Thus, the speed of processing data is obviously reduced.

Accordingly, the present invention proposes a method of using memory allocation to address hot and cold data to overcome the abovementioned problem. The principles and embodiments will be described in detail below.

SUMMARY OF THE INVENTION

The primary objective of the present invention is to provide a method of using memory allocation to address hot and cold data, wherein a mixed-type memory structure containing a volatile memory and a non-volatile memory is established; while the number of read/write events reaches a threshold or a random value, a memory object, which is corresponding to a memory address of a memory assigned by a malloc-like instruction, is assigned to a volatile or non-volatile memory of a main memory layer according to the access type of the last-layer cache and the memory address where the instruction is read, written or executed, or the access type performed by CPU on each layer of cache and the memory address where CPU performs reading, writing, or executing an instruction.

Another objective of the present invention is to provide a method of using memory allocation to address hot and cold data, which simplifies the profiling mechanism of the hardware structure and only records the address where data is read or written.

In order to achieve the abovementioned objectives, the present invention proposes a method of using memory allocation to address hot and cold data, which comprises steps: using a hardware performance monitor (HPM) to detect at least one read/write event of a computer system, wherein the computer system comprises a central processor; while the number of the read/write events reaches a threshold or a random value, the computer system recording an access type of the read/write event occurring latest and a memory address of a memory object causing the read/write event; and assigning the memory object to a volatile or non-volatile memory of a main memory layer or to another memory having a different access attribute according to the memory address and the access type of the memory object.

In one embodiment, the hardware performance monitor detects a read/write event in the central processor, a read/write event in at least one cache memory of the central processor, or a read/write event in a last-layer cache of the cache memory; the hardware performance monitor only records an address and a type of a reading activity, a writing activity or a fetching instruction of a missing event occurring in the last-layer cache.

In one embodiment, the access types in occurrence of the read/write event include an access type of the central processor, an access type of the cache memory, and an access type in occurrence of missing taking place in the last-layer cache.

In one embodiment, the access types of the read/write event include loading, storing, and fetching an instruction.

In one embodiment, the non-volatile memory is set to be a read-only memory; while the memory object of the memory address is assigned to and written into a data page in the non-volatile memory, an exception event is triggered; the computer system moves the data page to the volatile memory according to the exception event, amends a page table, and then writes corresponding information of the data page into the page table.

In one embodiment, at least one memory allocation instruction (such as a malloc function) of the computer system assigns the memory object; while the memory object is assigned, the computer system records which one of the memory allocation instructions assigns the memory address of the memory object, a common attribute of the memory address assigned by the memory allocation instruction (for example, the memory object assigned by the malloc function is usually hot data or cold data), the starting address and ending address of the memory object; the attribute of the memory allocation instruction is set according to the common attribute, and the memory objects assigned by the memory allocation instruction (that is malloc) are all set to have an identical initial attribute.

In one embodiment, the hardware performance monitor detect the memory at least one read/write/fetch event into the volatile memory or the non-volatile memory of the main memory layer; once the access of main memory is completed, the central processor is informed to undertake succeeding treatments. OR write the event to the memory by DMA (direct memory access)

In one embodiment, the attributes include hot data, cold data, and hot_cold data, wherein hot_cold data are originally hot data and then converted into cold data.

In one embodiment, the data pages are placed in the volatile memory or the non-volatile memory according to the attribute and a system target of maximum service life, best performance, or optimized energy consumption.

In one embodiment, the data pages are swapped-out to a swap-space of a flash memory, wherein the flash memory undertakes wear leveling.

In one embodiment, the present invention further comprises a step: According to an initialized direct memory access (DMA) function, making statistics of access numbers and attributes of memory objects accessed by the DMA functions and categorizing the attributes of the memory objects accessed by the DMA functions.

In one embodiment, the volatile memory is divided into a plurality of sections according to a system target; the system target is maximum service life, best performance, or optimized energy consumption; each of the sections stores corresponding data according to the system target.

In one embodiment, the section is partitioned dynamically or partitioned through an offline analysis.

In one embodiment, while the space of the volatile memory is insufficient, the data pages, which are most infrequently used in the future, are moved to the non-volatile memory or at least one secondary storage through varying the page table, and at least one data page is moved to the volatile memory from the non-volatile memory or the secondary storage. The computer system predicts future behavior of a memory allocation instruction by using the hardware performance monitor. For example, the computer uses the number of write/read of a memory object which is detected by the hardware performance monitor to determine whether the memory object is a hot object.

In one embodiment, the behavior of memory allocation instruction (that is malloc-like instruction) is predicted according to a least-recently-used (LRU) method, a least-frequently-used (LFU) method, a first-in-first-out (FIFO) method, or another memory behavior prediction method; the another memory behavior prediction method may be an Adaptive Replacement Cache (ARC) algorithm or a Clock with Adaptive Replacement (CAR) algorithm.

In the conventional technology, these algorithms use dirty bits or access bits to predict the behaviors of the memory object or the page. However, the present invention uses the number of write/read events which is detected by the hardware performance monitor or the type of an access behavior to predict the behaviors of the memory object or the page, and uses these behaviors to move the memory object or the page to a volatile memory and a non-volatile memory.

In one embodiment, the hardware performance monitor uses profiling or online analysis to monitor the behavior of memory object and decide the behavior of the malloc-like instruction.

In one embodiment, while executing the hardware performance monitor for the first time, the computer system establishes a statistic table to undertake profiling; while having collected information sufficient to determine the attribute of the memory allocation instruction, the computer system stops profiling; while executing a new memory allocation instruction having never seen before, the computer system restarts profiling until the computer system has collected information sufficient to determine the attribute of the memory allocation instruction.

In one embodiment, the hardware performance monitor neither records an instruction pointer triggering the read/write event nor records a register, wherein the register is a general register or a control register; the hardware performance monitor only records the access type of a read/write event (such as a fetching instruction, a reading activity, or a writing activity) and the memory address where the read/write event accesses the memory object.

DETAILED DESCRIPTION OF THE INVENTION

The present invention provides a method of using memory allocation to address hot and cold data, wherein a volatile memory and a non-volatile memory is combined to form a mixed-type memory structure, and wherein a memory object is assigned to a volatile or non-volatile memory according to the read/write type of the central processor, the cache memory, or the last-layer cache, whereby not only the profiling of the hardware structure is simplified, but also merely the address where data is read or written is recorded, wherefore the overload caused by profiling is relieved.

Figure 1:
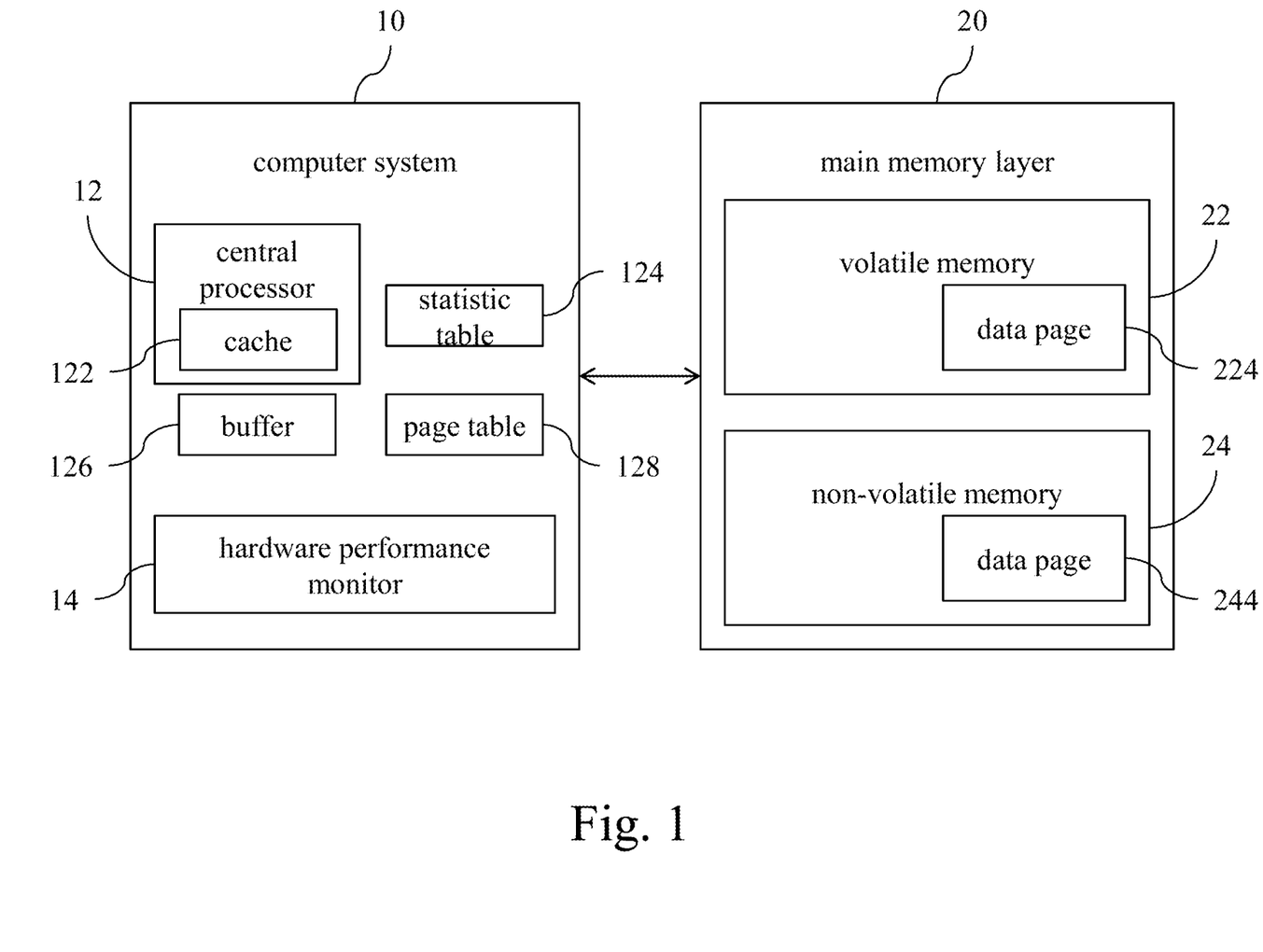
FIG. 1 is a diagram schematically showing the structure where a method of assigning a memory object to a hot or cold memory region according to the memory address is applied to according to one embodiment of the present invention.

Refer to FIG. 1, which is a diagram schematically showing the structure where a method of assigning a memory object to a hot or cold memory region according to the memory address is used according to one embodiment of the present invention. The structure comprises a computer system 10 and a main memory layer 20. The main memory layer 20 is a mixed-type memory structure, including a volatile memory 22 and a non-volatile memory 24. The volatile memory 22 and non-volatile memory 24 respectively contain a plurality of data pages 224 and 244. The computer system 10 includes a central processor 12, a hardware performance monitor (HPM) 14, a cache 122, a buffer 126, a page table 128, and a statistic table 124. In one embodiment, the buffer 126, the page table 128 and the statistic table 124 are stored in the main memory layer 20. In one embodiment, the cache 122 and the page table 128 are stored in the central processor 12. The hardware performance monitor 14 detects at least one read/write event, including the read/write events of the central processor 12 of the computer system 10.

Data pages 224, 244 are classified into the frequently-written data, the frequently-read data and the infrequently-accessed data. The frequently-written data, the frequently-read data are assigned to the volatile memory 22. The infrequently-accessed data are assigned to the non-volatile memory 24. While the storage space of the volatile memory 22 is insufficient, the data that will not be written or read in the near future is kicked out from the volatile memory 22, and the data that will be written or read later is moved to the non-volatile memory 24 according to LRU, LUF, the first-in-first-out rule, or another virtual memory page replacement method.

The frequently-written data and the frequently-read data are determined by the hardware performance monitor 14. The hardware performance monitor 14 can detect several types of events. Different counters (not shown in the drawings) are established in the hardware performance monitor 14 corresponding to different types of events, such as the counter for write events and the counter for read events. A threshold is set in each counter. After a corresponding event occurs, the counted value is the threshold minus 1. Once the counted value becomes zero, an interruption occurs. The hardware performance monitor 14 informs the central processor 12 of the computer system 10 of the interruption to write the events to the buffer 126 or writes the events to the corresponding buffer 126 (such as DS of INTEL PENTIUM™) by using DMA and then using interrupt to inform the corresponding system software.

The hardware performance monitor 14 uses profiling or online analysis to monitor and to assign the addresses of a memory object. In the case of the performance monitor of INTEL™, a Precise Event Based Sampling (PEBS) unit is built-in. While a preset event occurs, the PEBS unit stores the instruction pointer, the address to access data, the value in the regular register of the event, etc. into the buffer 126 of the central processor 12. However, it is very time-consuming to store the instruction pointer and the value in the regular register of the event into the buffer 126 if the skid of the interruption is guaranteed to be zero. In the present invention, it is only the memory address and the access type (such as loading in, storing, or fetching an instruction) of data that need recording. Therefore, the present invention can accelerate the access speed of data. The current 64-bit processor does not use all the 64 bits in addressing. Therefore, the present invention can encode the access type in the memory address. It should be noted: the present invention can apply to traditional performance monitors and new hardware designs. In the present invention, the access type may be additionally written in the memory address. For example, while each 63 pieces of memory addresses are written, the hardware with a 64-bit word to the buffer, wherein each bit of the word indicates the type (that is read or write) corresponding to a memory address. From a memory address, the computer system can trace back to learn which memory object the memory address belongs to and then trace back to learn which memory allocation instruction assigns the memory object. From the abovementioned process, the computer system can further learn the common attribute of the memory object assigned by the memory allocation instruction and attach the common attribute to the memory allocation instruction. While the memory allocation instruction allocates a memory object later, the default attribute of the memory object is exactly the attribute of the memory allocation instruction. Then, the computer system can assign the memory objects having an identical attribute to an identical group of data pages.

The hot or cold memory object allocated by the memory allocation instruction is related to the system status, system time or the size of the allocated memory object. The system status is used to assign the hotness or coldness of the memory object allocated by the memory allocation instruction.

If the memory object allocated by one memory allocation instruction is sometimes cold and sometimes hot, the type of the memory allocation instruction is set to be unknown. The unknown memory allocation instruction uses a general data/page migration algorithm to move the memory object to a volatile memory or a non-volatile memory.

It is not all the reading/writing activities (such as loading-in data and storing data) that will result in accessing memory. Therefore, the cache is further taken in consideration. At present, the cache 122 of the central processor 12 is a multilayer structure. For example, INTEL PENTIUM™ has three layers of caches. The central processor 12 does not access the non-volatile memory 22 unless information is missed by the last-layer cache. The computer system 10 does not record the information missed by the last-layer cache unless the number of the read/write events reaches the preset threshold or a random value in the present invention. While the activity that the central processor 12 accesses a specified memory address causes the last-layer cache 122 to miss information (that is cache miss), the computer system 10 brings the data missed in the last-layer cache 122 to the last layer cache 122 from the volatile memory 22 or the non-volatile memory 24. Alternatively, the computer system 10 writes data to the last-layer cache 122. While the number of corresponding events (such as the write data or read data is missed by the last-layer cache) reaches a specified value or a random value, an event is triggered, wherein the memory address of the data missed by the last-layer 122 and the cause inducing data missing (such as loading in, reading or fetching an instruction) are written to the buffer 126. Alternatively, an interruption is used to inform the computer system 12.

Figure 2:
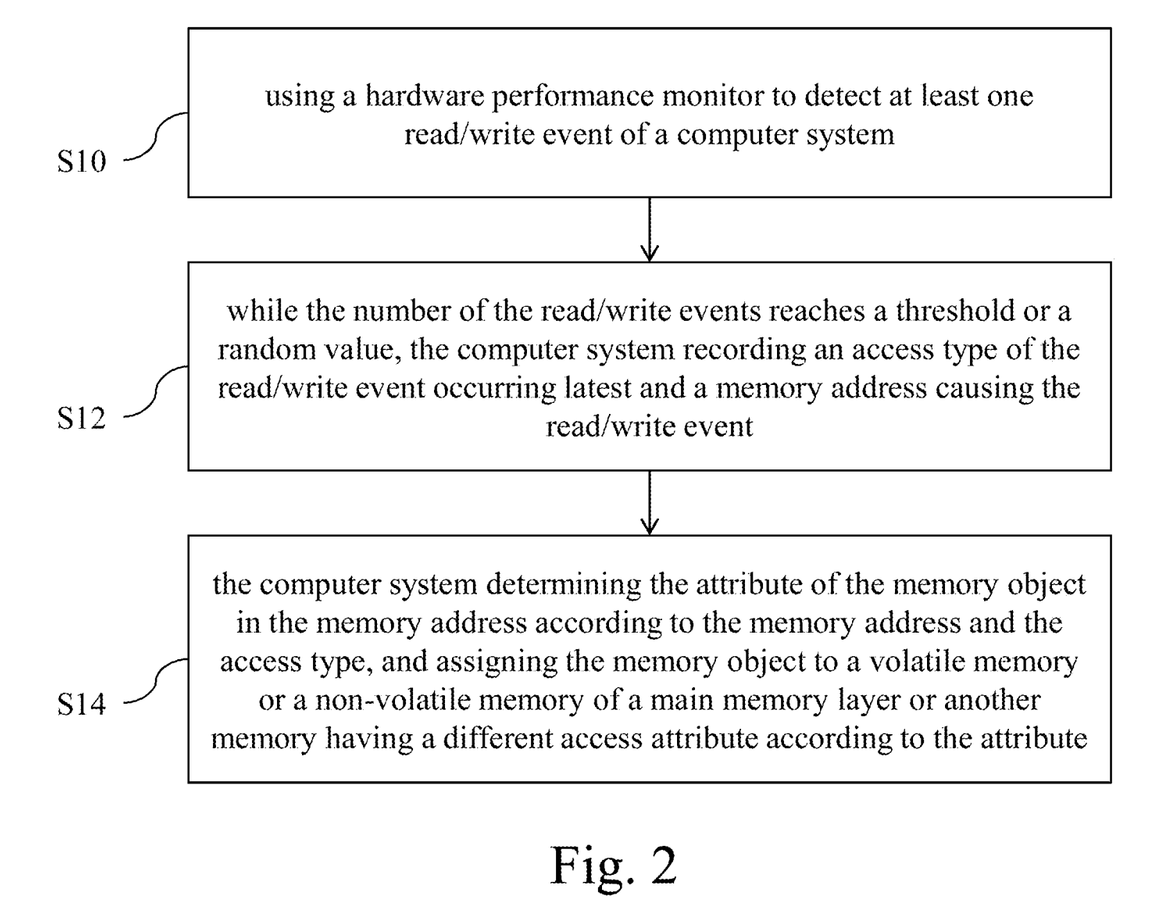
FIG. 2 is a flowchart of a method of using memory allocation to address hot and cold data according to one embodiment of the present invention.

Refer to FIG. 2, which is a flowchart of a method of using memory allocation to address hot and cold data according to one embodiment of the present invention. In Step S10, use a hardware performance monitor (HPM) 14 to detect at least one read/write event in a computer system. In detail, the hardware performance monitor 14 detects the read/write event in the central processor, the read/write event in at least one cache memory of the central processor, or the read/write event in the last-layer cache of the cache memory. In Step S12, while the number of the read/write events reaches a threshold or a random value, the computer system records the access type of the latest read/write event and the memory address of the memory object resulting in the read/write event (i.e. the address of data). The access type may be the read/write type of the central processor in the read/write event, the read/write type of the cache memory, or the read/write type of the last-layer cache in missing data. The read/write types include loading, storing or fetching an instruction. The computer system may process events in batch after the events has been accumulated to a given number (such as PEBS of INTEL™) or independently process each event (such as IBS of AMD™). The computer system ascribes the read/write events to different memory objects and sets the initial attribute (such as hot, cold, or hot-cold) of the memory object according to the proportions of various types of events.

In Step S14, the computer system determines the attribute of the memory object according to the memory address and the access type of the memory object and assigns the memory object to a volatile memory or a non-volatile memory in the main memory layer according to the attribute.

Figure 3:
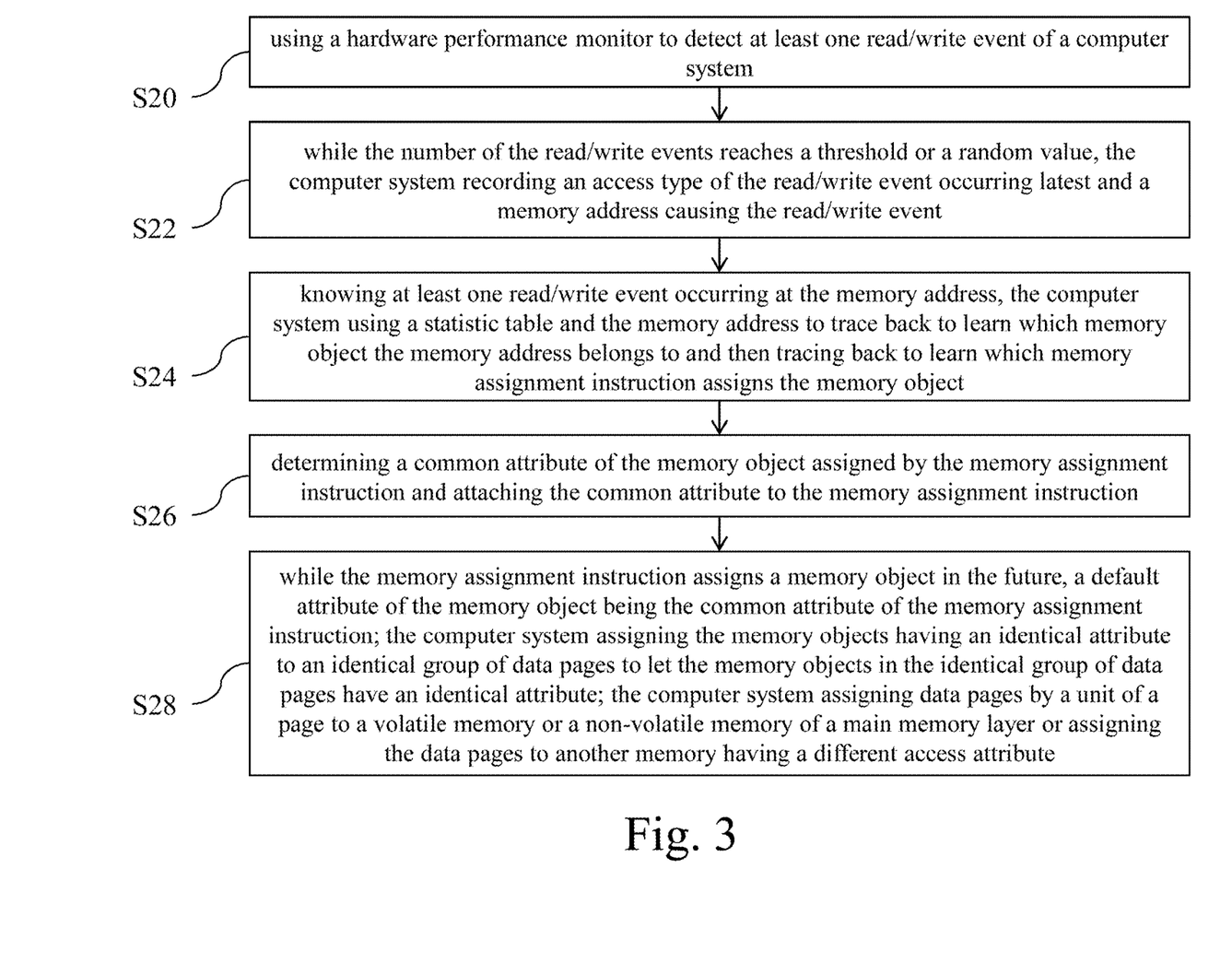
FIG. 3 is a flowchart of a method of using memory allocation to address hot and cold data according to another embodiment of the present invention.

Refer to FIG. 3, which is a flowchart of a method of using memory allocation to address hot and cold data according to another embodiment of the present invention. In FIG. 3, Step S20 and Step S22 are respectively identical to Step S10 and Step S12 in FIG. 2. In Step S24, since the computer system knows the read/write events occurring in the memory address, it can use a statistic table and the memory address to trace back to learn which memory object the memory address belongs to (For example, while assigning the memory object, the memory allocation instruction records the starting address and ending address of the memory object.) and then trace back to learn which memory allocation instruction assigns the memory object.

In Step S26, the computer system determines the common attribute of the memory objects assigned by the memory allocation instruction and attaches the common attribute to the memory allocation instruction. In Step S28, while the memory allocation instruction allocates a memory object, the default attribute of the memory object is the common attribute of the memory allocation instruction; the computer system assigns the memory objects having an identical attribute to an group of data pages; as the memory objects in each data page have an identical attribute, the data pages are assigned to a volatile memory or a non-volatile memory of the main memory according to the attributes of the pages.

The present invention specifies the attributes of memory objects (initial attributes) according to the following method. The computer system has an allocation mechanism to memory addresses (memory objects). Thus, a recording table is established in the computer system, i.e. the statistic table 124 in FIG. 1. The statistic table 124 records memory objects, the memory allocation instructions (that is malloc-like instructions) respectively assigning the memory objects, the starting address and ending address of each memory object, and the statistics made by the hardware performance monitor for the events of each memory object. For example, the memory allocation instruction may be a malloc function. A software system may have a plurality of memory allocation instructions, e.g. a plurality of malloc functions. According to the statistic table, the computer system analyzes to learn the attribute (such as hot or cold) of the memory object assigned by the memory allocation instruction and sets all the memory objects assigned the memory allocation instruction to have the abovementioned attribute. For example, the memory objects are categorized into the addresses of hot data, cold data, hot_cold data, etc. Then, the computer system classifies the memory allocation instructions according to the statistic table. Therefore, the memory objects assigned by a memory allocation instruction are placed in a group of data pages. In one embodiment, the data pages are swapped-out to a swap-space of a flash memory, wherein the flash memory undertakes wear leveling. In the present invention, the technology of hash table, tree, rb-tree, sorted list, or another data structure having key values is used to establish the statistic table.

While executing the function of the hardware performance monitor for the first time, the computer system may establish the statistic table to undertake profiling and collect and categorize all the memory allocation instructions (malloc functions) until the computer system has collected sufficient information and can categorize the malloc functions in the statistics. Then, the computer system stops profiling temporarily and categorizes all the memory objects assigned by the memory allocation instructions according to the statistic table. Once the computer system executes a new memory allocation instruction having never appeared in the statistic table, the computer system may restart the categorization process of profiling.

In managing volatile memories, the computer system may allocate space to read-intensive data and write-intensive data according to different system targets, such as the target of maximum service life, best performance, or optimized energy consumption. For example, while the target is to maximize the service life of non-volatile memories, the space of the volatile memory is allocated according to the size of the work set of the written page to store the frequently-written page, and the rest of the pages are used to store the frequently-read pages. Suppose that the target is to minimize energy consumption and that the non-volatile memory consumes more energy the volatile memory in reading and writing. The computer system multiplies the amount of reading and writing in each page by the energy consumption difference (i.e. the difference between the energy consumed in the non-volatile memory and the energy consumed in the volatile memory) and places the page consuming maximum energy in the volatile memory. Some memory objects are almost merely read (i.e. become hot-_cold data) after initialized (written massively). In such a case, these memory objects are placed in an identical page. Some memory objects are neither always initialized by the central processor nor always read/written by the central processor. For example, these memory objects are read or written through direct memory access (DMA). In such a case, the computer system intercepts the DMA functions to make statistics of the access numbers and attributes of these memory objects and categorize the attributes of the memory objects accessed by the DMA functions.

The computer system assigns different attributes to these memory objects and assigns the malloc-like instructions to the attributes. After assigning the malloc-like instructions to the attributes, the memory assigned by the malloc-like instructions and the malloc-like instructions have the same attributes.

As the volatile memory stores the most frequently-accessed data, a swap mechanism is required to control the data swap between the volatile memory and the non-volatile memory. The present invention can use the existing hardware (such as the write counts and read counts of a memory object collected by the hardware performance monitor) and the corresponding algorithms to administrate the volatile memory, to move the data, which is most infrequently used in the future, to the non-volatile memory or a secondary storage and then to move the data, which will be used later, to the volatile memory. In this part, the input of the algorithm is the number and type that the page is recorded (in such as PEBS of INTEL PENTIUM™), the number and type that the page is hit by interruption events (interrupted by the events that a specified number of events has occurred, such as IBS of AMD™), the number that the page is set as accessed (that is access bit), or the number that the page is set as written (that is dirty bits). The algorithms predicting that a page is most infrequently used in the future include the LRU-like algorithm, the LFU-like algorithm, a CAR (Clock with Adaptive Replacement (CAR))-ARC (Adaptive Replacement Cache) mixed algorithm, etc.

Figure 4:
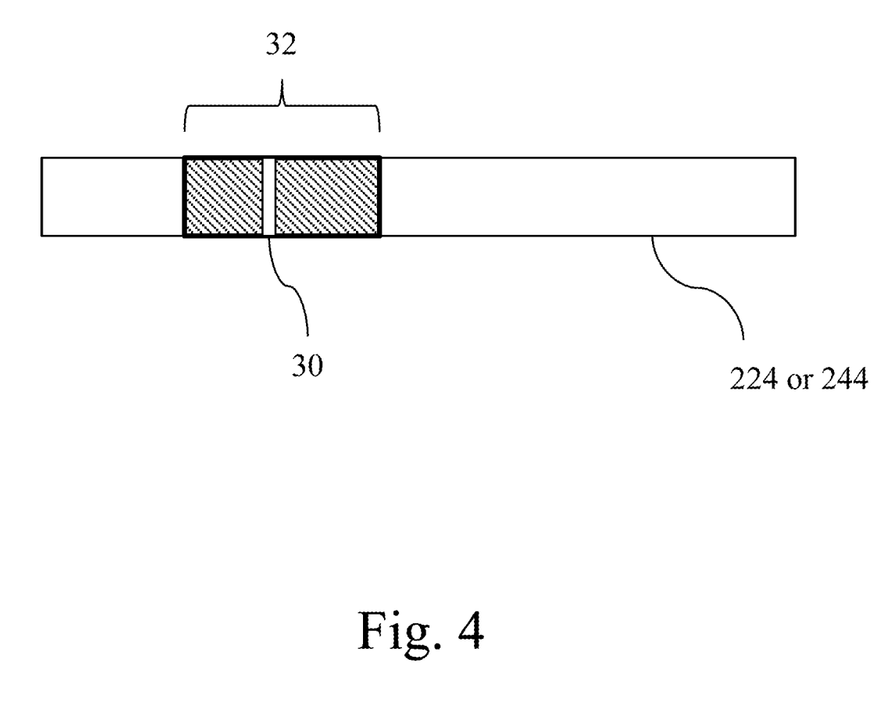
FIG. 4 is a diagram schematically showing a memory segment according to one embodiment of the present invention.

Refer to FIG. 4, which schematically shows that the attribute of a memory object is specified according to one embodiment of the present invention. Suppose the memory address where data is read or written is a memory address 30 in the data page 224 or 244. Thus, the memory segment 32 involving the memory address 30 is set to have the identical attribute. For example, as the attribute of the memory address 30 is frequently-written, the whole memory segment 32 is set to be frequently-written.

Besides, the volatile memory is divided into several sections according to the system target. The system target may be the maximum service life or best performance, etc. Each section stores the corresponding data according to the system target. The section may be partitioned dynamically or partitioned through an offline analysis. While the space of the volatile memory is insufficient, the memory objects, which are most infrequently used in the future, are moved to the non-volatile memory through varying the statistic table, and at least one new memory object is moved to the volatile memory from the non-volatile memory or a secondary storage device. In other words, the future behavior of a memory allocation instruction can be predicted according to the read/write events in the table, which are detected by the hardware performance monitor. The allocation of memory objects can be decided according to the least-recently-used-like (LRU-like) methods, the least-frequently-used-like (LFU-like) methods, the first-in-first-out (FIFO) method, or another memory behavior prediction method.

The hardware performance monitor directly writing the read/write events into the volatile memory or non-volatile memory of the main memory layer. Once the volatile and non-volatile memories of the main memory layer are filled up, the central processor is informed to undertake the succeeding treatment.

In the present invention, the central processor does not necessarily record the instruction pointer triggering a read/write event and registers, wherein the registers may be a general register or a control register.

The embodiments described above are only to exemplify the present invention but not to limit the scope of the present invention. Any equivalent modification or variation according to the characteristic or spirit of the present invention is to be also included by the scope of the present invention.

What is claimed is:

1. A method of using memory allocation to address hot and cold data, comprises steps:
   using a hardware performance monitor (HPM) to detect at least one read/write event of a central processor of a computer system;
   said computer system recording an access type and an address of said at least one read/write event occurring latest; and
   said computer system determining an attribute of a memory object according to an access type of a malloc-like instruction, an access types of the memory object is allocated by said malloc-like instruction, and said access type of said memory object is determined in profiling phase or on-line analysis phase by using HPM, and assigning said memory object to a volatile memory or a non-volatile memory of a main memory layer according to said access type of the memory object allocated by said malloc-like instruction;
   wherein memory allocation instructions of said computer system assigns said memory object, and wherein while said memory object is assigned, said computer system records which one of said memory allocation instructions assigns said memory object and an attribute of said memory object assigned by said memory allocation instruction, and wherein an attribute of said memory allocation instruction is set according to a common attribute of a plurality of memory objects allocated by said memory allocation instructions in profiling phase or in on-line profiling phase, and said plurality of memory objects assigned by said memory allocation instruction are all set to have an identical initial attribute.

2. The method of using memory allocation to address hot and cold data according to claim 1, wherein said hardware performance monitor detects a read/write event in said central processor, a read/write event in at least one cache memory of said central processor, or a read/write event in a last-layer cache of said cache memory.

3. The method of using memory allocation to address hot and cold data according to claim 2, wherein said hardware performance monitor only records an address and a type of a reading activity, a writing activity or a fetching instruction of a missing event occurring in said cache.

4. The method of using memory allocation to address hot and cold data according to claim 2, wherein access types in occurrence of said at least one read/write event include an access type of said central processor, an access type of said cache memory, and an access type in said last-layer cache when cache miss in said last-layer cache.

5. The method of using memory allocation to address hot and cold data according to claim 1, wherein said access types of said at least one read/write event includes loading, storing, and fetching an instruction.

6. The method of using memory allocation to address hot and cold data according to claim 1, wherein said non-volatile memory is set to be a read-only memory, and wherein while said memory object of a memory address is assigned to and written into a data page in said non-volatile memory, an exception event is triggered, and wherein said computer system moves said data page to said volatile memory according to said exception event, amends a page table, and then writes corresponding information of said data page into said page table.

7. The method of using memory allocation to address hot and cold data according to claim 1, wherein said attributes of the plurality of memory objects includes hot data, cold data, and hot_cold data, which are hot data converted from cold data.

8. The method of using memory allocation to address hot and cold data according to claim 1, wherein said hardware performance monitor directly records at least one read/write event into a buffer in said volatile memory or said non-volatile memory of said main memory layer, and wherein once said buffer is filled up, said central processor is informed to undertake succeeding treatments.

9. The method of using memory allocation to address hot and cold data according to claim 6, wherein said data page is placed in said volatile memory or said non-volatile memory according to said attribute and a system target of maximum service life, best performance, or optimized energy consumption.

10. The method of using memory allocation to address hot and cold data according to claim 9, wherein said data page is swapped-out to a swap-space of a flash memory, wherein said flash memory undertakes wear leveling.

11. The method of using memory allocation to address hot and cold data according to claim 1 further comprising a step: according to an initialized direct memory access (DMA) function, making statistics of access numbers and attributes of a plurality of memory objects accessed by said DMA functions and categorizing said attributes of said plurality of memory objects accessed by said DMA functions.

12. The method of using memory allocation to address hot and cold data according to claim 1, wherein said volatile memory is divided into a plurality of sections according to a system target, and wherein said system target is maximum service life, best performance, or optimized energy consumption, and wherein each of said sections stores corresponding data according to said system target.

13. The method of using memory allocation to address hot and cold data according to claim 12, wherein said section is partitioned dynamically or partitioned through an offline analysis.

14. The method of using memory allocation to address hot and cold data according to claim 6, wherein while space of said volatile memory is insufficient, said data page, which is most infrequently used in the future, is moved to said non-volatile memory or at least one secondary storage through modify said page table, and at least one new memory object is moved to said volatile memory from said non-volatile memory or said at least one secondary storage.

15. The method of using memory allocation to address hot and cold data according to claim 1, wherein said computer system predicts future behavior of a memory allocation instruction according to events of reading, writing, and fetching instructions, which are detected by said hardware performance monitor.

16. The method of using memory allocation to address hot and cold data according to claim 14 wherein said space of said volatile memory is allocated according to a least-recently-used-like (LRU-like) methods, a least-frequently-used-like (LFU-like) method, a first-in-first-out (FIFO) method, or another memory behavior prediction method, and wherein said another memory behavior prediction method is an Adaptive Replacement Cache (ARC-like) algorithms or a Clock with Adaptive Replacement (CAR-like) algorithms.

17. The method of using memory allocation to address hot and cold data according to claim 1, wherein said hardware performance monitor uses profiling or online analysis to monitor and assign plural memory addresses.

18. The method of using memory allocation to address hot and cold data according to claim 17, wherein while executing said hardware performance monitor for the first time, said computer system establishes a statistic table to undertake profiling; while having collected information sufficient to determine an attribute of a memory allocation instruction, said computer system stops profiling; while executing a new memory allocation instruction having never seen before, said computer system restarts profiling until said computer system has collected information sufficient to determine an attribute of said memory allocation instruction.

19. The method of using memory allocation to address hot and cold data according to claim 1, wherein said hardware performance monitor neither records an instruction pointer triggering said at least one read/write event nor records a register, and wherein said register is a general register or a control register.

20. A method of using memory allocation to address hot and cold data, comprises the following steps:
using a hardware performance monitor (HPM) to detect at least one read/write/fetch event of a computer system, wherein said computer system comprises a central processor; said computer system recording an access type of said at least one read/write/fetch event occurring latest and a memory address of aft first memory object causing said at least one read/write/fetch event; knowing the at least one read/write/fetch event occurring at said memory address, said computer system using a statistic table to trace back to learn which memory object belongs to said memory address and then tracing back to learn which one of memory allocation instructions assigns said first memory object; determining a common attribute of said first memory objects causing said at least one read/write/fetch events by calculating frequency of the at least one read/write/fetch events to said first memory object, and attaching said common attribute to said memory allocation instruction; and while said memory allocation instruction assigns second memory objects in execution phase, a default attribute of said second memory objects being said common attribute; said computer system assigning said second memory objects in execution phase having an identical attribute to an identical group of data pages to let said second memory objects in said identical group of data pages have an identical attribute; said computer system assigning data pages by a unit of a page to a volatile memory or a non-volatile memory of a main memory layer to maximize system objective function.

21. The method of using memory allocation to address hot and cold data according to claim 20, wherein said hardware performance monitor detects a read/write event in at least one cache memory of said central processor or a read/write event in a last-layer cache of said cache memory.

22. The method of using memory allocation to address hot and cold data according to claim 21, wherein said hardware performance monitor only records an address and a type of a reading activity, a writing activity or a fetching instruction of a cache miss occurring in said last-layer cache.

23. The method of using memory allocation to address hot and cold data according to claim 21, wherein access types in occurrence of said at least one read/write/fetch event includes an access type of said central processor, an access type of said cache memory, or an access type in said last-layer cache when said last-layer cache miss.

24. The method of using memory allocation to address hot and cold data according to claim 20, wherein said access types of said at least one read/write/fetch events includes loading, storing, and fetching instruction.

25. The method of using memory allocation to address hot and cold data according to claim 20, wherein said non-volatile memory is set to be a read-only memory, and wherein while said first memory object of said memory address is assigned to and written into a data page in said non-volatile memory, an exception event is triggered, and wherein said computer system moves said data page to said volatile memory according to said exception event, amends a page table, and then writes corresponding information of said data page into said page table.

26. The method of using memory allocation to address hot and cold data according to claim 20, wherein while said memory allocation instruction allocates said second memory object in profiling phase or online profiling phase, said computer system records which one of said memory allocation instructions allocates said second memory objects and a common attribute of said second memory objects is allocated by said memory allocation instruction, and wherein an attribute of said memory allocation instruction is set according to said common attribute of said second memory objects, and in normal execution phase the common attribute of said second memory objects assigned by said memory allocation instruction is set to said attribute of said memory allocation instruction.

27. The method of using memory allocation to address hot and cold data according to claim 26, wherein said common attribute of said second memory objects includes hot data, cold data, and hot cold data, which are hot data converted from cold data.

28. The method of using memory allocation to address hot and cold data according to claim 26, wherein said hardware performance monitor directly write at least one read/write/fetch event into said buffer, and wherein once space for said buffer is filled up, said central processor is informed to undertake succeeding treatments.

29. The method of using memory allocation to address hot and cold data according to claim 20, wherein said data pages are placed in said volatile memory or said non-volatile memory according to said common attribute and a system target of maximum service life, best performance, or optimized energy consumption.

30. The method of using memory allocation to address hot and cold data according to claim 29, wherein said data pages are swapped-out to a swap-space of a flash memory, wherein said flash memory undertakes wear leveling.

31. The method of using memory allocation to address hot and cold data according to claim 20, wherein said volatile memory is divided into a plurality of sections according to a system target, and wherein said system target is maximum service life, best performance, or optimized energy consumption, and wherein each of said sections stores corresponding data according to said system target.

32. The method of using memory allocation to address hot and cold data according to claim 20, wherein said computer system predicts future behavior of a memory allocation instruction according to events of reading, writing, and fetching instructions, which are detected by said hardware performance monitor.

33. The method of using memory allocation to address hot and cold data according to claim 20, wherein said hardware performance monitor uses profiling or online analysis to monitor and assign said memory addresses.

34. The method of using memory allocation to address hot and cold data according to claim 33, wherein while executing said hardware performance monitor for the first time, said computer system establishes a statistic table to undertake profiling; while having collected information sufficient to determine an attribute of said memory allocation instruction, said computer system stops profiling; while executing a new memory allocation instruction having never seen before, said computer system restarts profiling until said computer system has collected information sufficient to determine an attribute of said new memory allocation instruction.

35. The method of using memory allocation to address hot and cold data according to claim 20, wherein said hardware performance monitor neither records an instruction pointer triggering said at least one read/write/fetch event nor records a register, and wherein said register is a general register or a control register.

36. The method of using memory allocation to address hot and cold data according to claim 20, wherein said hardware performance monitor records addresses and access type of accessed data, and wherein accessing includes reading, fetching instructions, and writing data.

37. A method of using memory allocation to address hot and cold data, comprising steps:
using a hardware performance monitor (HPM) to detect at least one read/write event of a central processor of a computer system;
said computer system recording a memory page and access type of said read/write event occurring latest; and
using a reading activity, a writing activity or a fetching instruction to access the memory page and using a memory behavior prediction method to assign the memory page to a volatile memory or a non-volatile memory;
wherein memory allocation instructions of said computer system assigns said memory object, and wherein while said memory object is assigned, said computer system records which one of said memory allocation instructions assigns said memory object and an attribute of said memory object assigned by said memory allocation instruction, and wherein an attribute of said memory allocation instruction is set according to a common attribute of a plurality of memory objects allocated by said memory allocation instructions in profiling phase or in on-line profiling phase, and said plurality of memory objects assigned by said memory allocation instruction are all set to have an identical initial attribute.

38. The method of using memory allocation to address hot and cold data according to claim 37, wherein in said at least one read/write event of said central processor, each layer of a cache.

39. The method of using memory allocation to address hot and cold data according to claim 37, wherein a frequently-read said memory page is stored in said volatile memory.

40. The method of using memory allocation to address hot and cold data according to claim 37, wherein a frequently-written said memory page is stored in said volatile memory.

41. The method of using memory allocation to address hot and cold data according to claim 37, wherein said hardware performance monitor neither records an instruction pointer triggering the read/write event nor records a register, wherein the register is a general register or a control register.

\* \* \* \* \*